(12) United States Patent
Pugliese, III (10) Patent No.: US 6,865,539 B1
(45) Date of Patent: Mar. 8, 2005

(54) ELECTRONIC SYSTEM FOR PARKING MANAGEMENT AND PERSONAL GUIDANCE

(76) Inventor: Anthony V. Pugliese, III, Crystal Corporate Center, 2500 Military Trail, Suite 200, Boca Raton, FL (US) 33431

( * ) Notice: Subject to any disclaimer, the term of this patent is extended or adjusted under 35 U.S.C. 154(b) by 0 days.

(21) Appl. No.: 09/577,151

(22) Filed: May 24, 2000

(51) Int. Cl.[7] .............................................. G06F 17/60
(52) U.S. Cl. .............................................. 705/5; 705/6
(58) Field of Search ............................... 705/1, 5, 6, 13

(56) References Cited

U.S. PATENT DOCUMENTS

| 5,790,976 A | * | 8/1998 | Boll et al. | .................. 701/209 |
| 6,147,624 A | * | 11/2000 | Clapper | ................... 340/932.2 |

FOREIGN PATENT DOCUMENTS

| JP | 409245296 A | * | 9/1997 | ............ G08B/1/14 |
| WO | WO93/01567 | * | 1/1993 | ........... G07B/15/04 |

OTHER PUBLICATIONS

"Traveling high–tech: a road warriors guide to taking the information highway with you." by Inc. (Inc), Jun. 18, 1996, v18,n9,pS1, entire document.*

"Electronics as your copilot", by O'Malley in Popular Science, Sep. 1991, v239, n3n P66, entire document.*

"Neural network can read a car's plates" by Woolnough, Jun. 1994, Electronic Engineering Times, p44, entire document.*

Travelocity.com web page, Mar. 2, 2000, entire document.*

* cited by examiner

*Primary Examiner*—John G. Weiss
*Assistant Examiner*—Michael J. Fisher
(74) *Attorney, Agent, or Firm*—Antonelli, Terry, Stout & Kraus, LLP (57) ABSTRACT

A parking management and personal guidance system operates in conjunction with a reservation system which stores and manages reservation information in connection with prescheduled activities. Parking management is effected by accessing reservation information using personal identification information and identifying to the driver of a vehicle an available parking space which is near to the pedestrian exit of the parking facility which is closest to the prescheduled activity indicated in the reservation information. Personal guidance is also effected from the parking facility to the prescheduled activity, such as to an assigned seat, including guidance inbetween, such as on public transportation. Theft prevention in the parking facility is also provided.

36 Claims, 8 Drawing Sheets

| PASSENGER NAME | | |
|---|---|---|
| PASSENGER ADDR. | CREDIT CARD INFO. | |
| PASSENGER I.D. CARD # | | |
| PASSENGER PHONE # | SPECIAL NEEDS | TYPE OF PASSENGER |
| FREQUENT FLIER RECORD | PHOTO I.D. (GRAPHIC DATA) | |

⎫ GENERAL PASSENGER INFO.

| RESERVATION NUMBER | |
|---|---|
| FLIGHT NO. | DEPARTURE TIME |
| DEPARTURE DATE | OTHER PERSONS IN PARTY |
| DESTINATION | SEAT ASSIGNMENTS |
| GATE INFO. | BAGGAGE INFO |
| BOARDING PASS ISSUED | PARKING INFO. |
| MESSAGE | |

⎫ RESERVATION #1

| RESERVATION NUMBER | |
|---|---|
| FLIGHT NO. | DEPARTURE TIME |
| DEPARTURE DATE | OTHER PERSONS IN PARTY |
| DESTINATION | SEAT ASSIGNMENTS |
| GATE INFO. | BAGGAGE INFO. |
| BOARDING PASS ISSUED | PARKING INFO. |
| MESSAGE | |

⎫ RESERVATION #2

⎫ RESERVATION #N

ELECTRONIC SYSTEM FOR PARKING MANAGEMENT AND PERSONAL GUIDANCE

BACKGROUND OF THE INVENTION

The present invention relates in general to a parking management and personal guidance system for persons traveling to a predetermined activity; and, more particularly, the invention relates to an electronic system which aids a driver of a vehicle in finding an available parking space in a large parking area or garage using previously stored information as to the destination of the driver at which a predetermined activity is to take place, directs the driver from the parking space to the designated destination, guides the driver as to this/her movements during the predetermined activity, aids the driver in finding the parked vehicle after the driver returns to retrieve the vehicle, provides a means of communication to obtain help at the parking space in the case of an emergency, automatically charges the cost of parking to the driver's credit account, and provides security against theft of the vehicle from the parking area or garage during the drivers absence.

As larger airports, arenas, stadiums, halls, shopping malls and various centers for sports events and the performing arts are being built to accommodate ever increasing numbers of people who wish to view or otherwise participate in activities associated with these venues, the problems involved in providing convenient parking for large numbers of cars have increased tremendously. Even with the availability of public transportation in some cases, these problems have persisted, since most people prefer the convenience of travel in their own vehicles.

In the case of a sporting event, for example, parking attendants will direct drivers so as to progressively fill a large parking area without regard to whether a parking space to which a driver is directed is convenient to the entrance closest to his or her seat, and this makes it difficult to find one's way to that gate and seat, not to mention the difficulty in finding the vehicle when leaving.

Additional problems occur when parking at an airport. Often, passengers arrive at the last minute at the airport and need to reach the terminal as quickly as possible. If they have a vehicle to park, there is the problem of finding a parking place in the parking garage without too much driving back and forth. Also, to save time, they should park close to the exit which leads to the particular terminal or gate from which their flight is leaving.

Thus, they need to know what terminal or gate they are to go to, what exit from the parking garage is closest to that terminal or gate and what parking space is available close to that exit.

Another problem with airport parking occurs when returning on a flight. Often a passenger will forget where his vehicle is parked, particularly in a complex multi-level parking facility. Such parking garages will have signs instructing people to write down the location of their vehicle when they park, so that they will be able to find the vehicle later when they return, but it is not uncommon for people to ignore such advice or lose the note they wrote with the identity of the parking location.

There is also a problem of theft of vehicles from a parking garage. In those parking facilities where an attendant is provided only at the exit to collect parking fees, security can be a substantial problem unless there is some way to match the parking ticket with the vehicle itself. In this regard, a thief could come to the parking facility on foot, obtain a parking ticket from the automatic dispenser by simply pressing the button, obtain access to and start a vehicle in the garage and drive away through the exit after paying the attendant using the parking ticket. Unless the attendant can match the parking ticket to the vehicle, he has no way of knowing that the vehicle is being stolen.

People also need some guidance in going from one facility to another, such as from a parking area or ticket counter to a boarding gate in an airport, where a monorail or tram is provided to reach the terminal building where the gates are located from separate buildings where parking is provided or the ticket counters and baggage check-in are provided. Typically, the only guidance that is now provided is in the form of video monitors located at the ticket counters or at the gates themselves, thereby requiring passengers who arrive in the parking area to go to the ticket counters to find out what gate to go to even if they already have a ticket or don't need a ticket or wish to check baggage.

Guidance is particularly needed for airline passengers on connecting flights who need to go from an arrival gate to a departure gate at an intermediate stop, often with little time available. Where travel between gates on a monorail or tram is provided, it can be confusing to a passenger not familiar with the airport to determine what stop to get off at to reach the departure gate.

Further, passengers who board a plane sometimes have trouble finding their seats even though they have a seat number printed on their boarding pass. Attendants are available to aid such passengers, but some people still sit in the wrong seats, causing confusion and possible delay of the flight.

Various parking management systems have been proposed to address some of the foregoing problems. For example, the Farmont U.S. Pat. No. 5,504,314 discloses a system in which detectors are provided in each parking space in a parking facility to determine which spaces are occupied. The system then can direct incoming vehicles to an empty space; however, the space selection is made indiscriminately and without regard to the destination of the driver after the vehicle is parked.

The Farmont system also has a security feature in that the number of the parking ticket is stored in a central data base along with the number of the space assigned to the vehicle at the time the ticket is issued. Then, if a thief attempts to steal a vehicle, a comparison is made between the ticket being presented and the number stored in the data base for the space which is evacuated, and, if the numbers do not correspond, the vehicle can be stopped. However, this scheme has numerous problems, the most likely of which is that the person who is parking the vehicle may not actually park it in the space assigned to him/her, which would completely confuse the system. Further, Farmont provides no guidance or aid to a driver after he/she leaves the parking area.

The Zeitman U.S. Pat. No. 5,940,481 also discloses a parking management system having a security feature in which a central control unit having a data base stores such information as parking facility availability, vehicle identification, user identification, billing information, time of use information, and law enforcement information. However this system is used primarily to provide information to anyone looking for an available parking facility within a city or town, to facilitate billing for the use of a parking space and to aid law enforcement in preventing improper use of parking facilities.

SUMMARY OF THE INVENTION

The U.S. application Ser. No. 342,658, filed on Nov. 21, 1994, by Joel R. Goheen, now U.S. Pat. No. 5,724,520, issued Mar. 3, 1998, the subject matter of which is incorporated herein by reference, discloses an electronic ticketing and reservation system and method in which a person may make a reservation for any pre-planned activity to be participated in at a future date and be admitted to the preplanned activity without the need to present a paper ticket.

In the Goheen system and method, as applied to airline travel, for example, a prospective passenger will typically place a telephone call to an airline reservation center, obtain flight availability information and book a reservation on a selected future flight. The system then establishes a reservation for the prospective passenger by storing in a central computer a file containing personal information concerning the prospective passenger and flight information concerning the selected future flight for which the reservation is being booked. The personal information is basically the passenger's personal identification, such as a personal I.D. # and/or the individual's name, address and telephone number. The flight information will typically include the flight number, date and time of departure, the departure airport and the destination airport. This concludes the reservation process, and unlike other reservation systems and methods, the passenger is not issued a paper ticket. However, the airline will issue a personal identification card to the passenger for use in connection with the current reservation and future reservations made by the passenger with the airline. This personal identification card includes no flight or other reservation information, but carries on a magnetic strip, for example, only information which identifies the individual passenger, such as a passenger personal I.D. number. In lieu of a card having a magnetic strip, an rf contact-less device capable of providing the same information as a magnetic card may be issued to the passenger for identification purposes.

When the passenger arrives at the airline terminal on the day of the flight for which he or she has a reservation, the passenger may proceed directly to the gate from which the flight is to depart and presents to an airline agent at the gate the personal identification card, which carries his or her I.D. number or name, as well as proof of identity, such as a driver's license or I.D. card carrying a picture of the passenger. The airline agent then accesses the central computer which stores all reservation information to validate the passenger's reservation for the particular flight which is scheduled to leave from that gate, such as by placing the personal I.D. card in a card reader, which transfers the passenger identification information to the central computer. If the central computer validates the reservation, the passenger is then issued a boarding pass or is allowed to proceed directly onto the airplane. With an rf contact-less device, the passenger could receive a boarding pass at an ATM without the intervention of an attendant. In either case, validation of the passenger's reservation is effected without the need for the passenger to present the typical airline ticket.

The passenger I.D. card or rf contact-less device need be issued to a particular individual by the airline only the first time that individual makes a reservation with the airline, and the card or device may then be used by the individual in the future for purposes of identification in connection with any future flight reservations made by that individual. This I.D. card may be used by the individual upon arrival at the airline gate for purposes of identifying the individual to the airline agent, and the I.D. card or rf contact-less device may also be used by the individual upon arrival at the airline terminal to access flight and gate information at an ATM provided at one or more locations in the airline terminal and from which flight information in the central computer records may be accessed.

It is an object of the present invention to provide an improved parking management system and method which employs central control features of the type provided, for example, in the Goheen system.

It is an object of the present invention to provide a parking management system and method which is capable of selecting and visually indicating one or a plurality of parking spaces in a parking facility to the driver of a vehicle to allow the driver to park the vehicle at a location which is closest to a desired destination in the vicinity of the parking facility.

It is an object of the present invention to provide a parking management system and method in which previously stored reservation information is accessed in response to the input of a personal identification, and one or more available parking spaces in a parking facility are identified on the basis of their proximity to a destination designated by the reservation information.

It is another object of the present invention to provide a parking management system and method in which previously stored reservation information is accessed in response to the input of a personal identification, and this reservation information is used to guide a person from a parking space in a parking facility to a destination indicated in the reservation information.

It is a further object of the present invention to provide a parking management system and method which provides an increased security against theft of a vehicle parked in a parking facility by ensuring that a person who attempts to leave the parking facility in a vehicle is the same person who arrived at the parking facility in that same vehicle.

To achieve the foregoing objects, at the entrance to the parking facility there is provided an entrance gate controller and display screen. The entrance gate controller has a card reader for reading personal identification information from a magnetic strip or bar code on a card inserted therein and a communication device for sending the personal identification information to a remotely located central reservation system, such as disclosed in the above-mentioned Goheen patent. In response to the received personal identification information, the central reservation system searches its database to access reservation information, such as specific flight information in the case where the parking facility serves an airport or seat location information in the case where the parking facility serves a stadium or arena, for example, and this reservation information is sent to the entrance gate controller. On the basis of this reservation information, the entrance gate controller can determine the destination of the person in the vehicle to be parked and can select and identify via the display panel one or more available parking spaces near a pedestrian exit of the parking facility which is closest to that destination.

For those not having a personal identification card, the entrance gate controller is provided with other means of obtaining the personal identification of the driver of a vehicle to be parked, such as a keypad or touch screen to allow manual entry of personal identification information. Also, a fingerprint detector and/or retinal scanner may be provided for this purpose, as well as a detector responsive to infra red or rf signals.

For those persons who do not have a reservation for an activity, such as someone who is at an airport simply to pick up a passenger or where the parking facility services a shopping mall, for example, the gate controller has a ticket dispenser operated by a push button to dispense a ticket having an identifying number and a time and date stamp. With the dispensing of a ticket, the ticket number is used to create a personal file in data storage.

As a security feature, a video camera is also provided at the vehicle entrance to the parking facility to scan the license plate of a vehicle at the entry gate, and an optical character reader is provided in the gate controller to produce a digital representation of the license plate number, which is sent to the central reservation system (or other data storage) where it is stored in the personal file of the driver of the vehicle.

At the vehicle exit of the parking facility, there is a similar exit gate controller and video camera. The driver of the vehicle inserts his/her personal identification card (or ticket received at the vehicle entrance) into the card reader, and the central reservation system is accessed once again. In the central reservation system, payment for parking is effected automatically on the basis of stored credit information, only after a comparison has been made between the driver and the identity of the vehicle by comparing stored license plate information with license plate information obtained from the video camera at the vehicle exit gate. If the license plate numbers do not compare, the vehicle is detained.

The accessed reservation information is also used by the system to guide the individual from the parking space to his/her destination not only by providing a printout indicating an airline gate number, but also identifying the pedestrian exit to be used to most efficiently reach the gate. In addition, where a monorail or tram is provided between the parking facility and the terminal building, or between terminals in the case of a connecting flight, a detector (preferably contact-less) is provided at the entrance to each car of the monorail or tram to detect the personal identification of an individual entering the car, and a display is provided in the car on which the system displays the individual's name, gate number and stop based on the reservation information accessed from main storage.

Finally, a small display is provided in the vicinity of each seat or seat row on which the name of the passenger assigned to the respective seats can be displayed. As the passenger boards the plane, the ID # of the passenger is forwarded to main storage to access the passenger file. The passenger file is updated to indicate that the passenger has boarded and the seat assignment of the passenger is retrieved and forwarded to the gate, from which the seat information is forwarded to the appropriate seat display to allow the boarding passenger to easily identify his/her seat.

These and other objects, features and characteristics of the present invention will become more apparent from the following detailed description when taken in conjunction with the accompanying drawings.

DETAILED DESCRIPTION OF THE PREFERRED EMBODIMENTS

A preferred embodiment relating to an airport parking facility will now be described with reference to the accompanying drawings.

Figure 1:
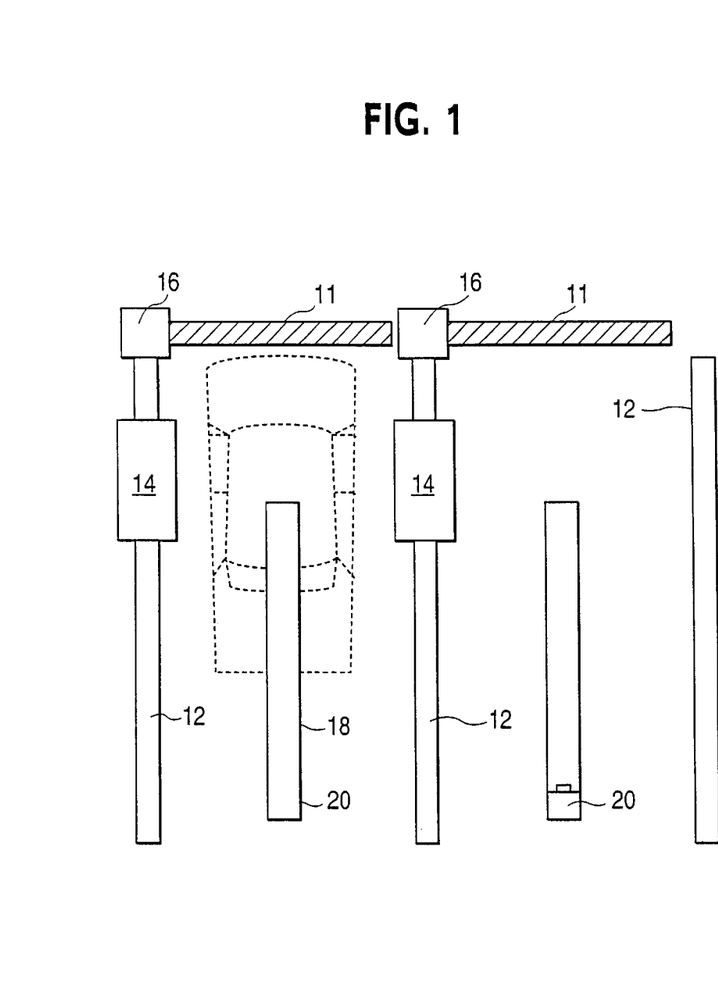
FIG. 1 is a diagram showing a top view of the vehicle entrance of a parking facility which employs the parking management system of the present invention.

As seen in FIG. 1, the vehicle entrance to the parking facility includes a plurality of entry lanes each defined by an electrically controllable gate 11 and a pair of curbs 12 to guide a vehicle into the lane and up to the gate 11. A system controller 14 is mounted on each curb 12 at a position where it will be aligned with the driver's window of a vehicle in the lane. A gate actuator 16 is responsive to the system controller 14 to raise and lower the gate 11 to allow selective access by a vehicle to the parking facility.

Each entry lane at the vehicle entrance also is provided with a central curb 18 to aid in positioning a vehicle in the lane, and a video camera 20 is mounted in this central curb 18 at a position where it can clearly view the rear of a vehicle which has pulled into the lane to a position adjacent the system controller 14. The video camera 20 is used to pick up the license number from the vehicle tag mounted on the rear of the vehicle for identification purposes.

Figure 2:
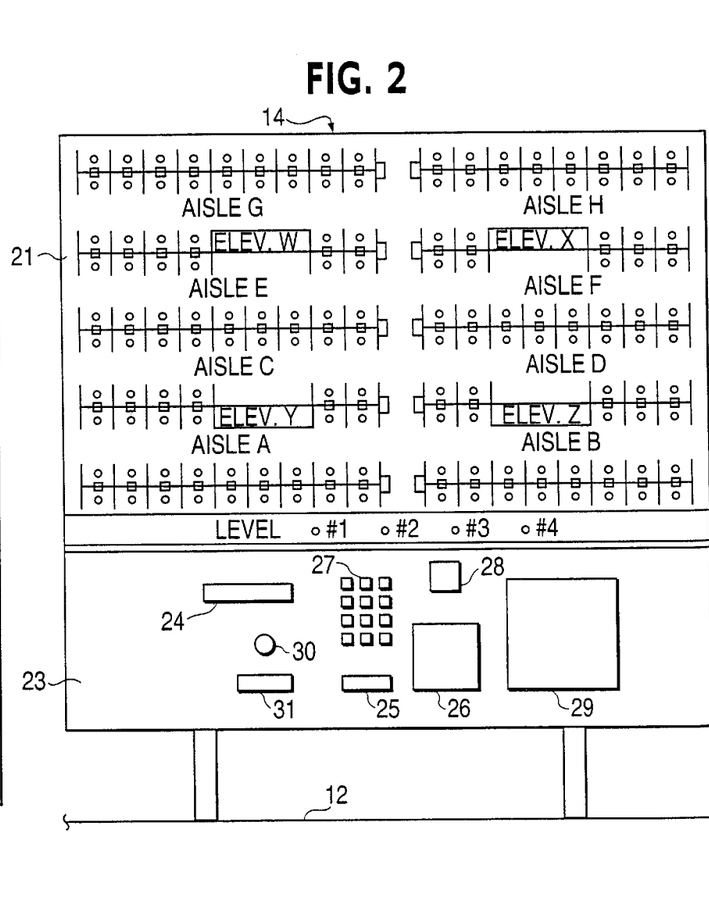
FIG. 2 is a diagram of the gate controller and display panel in the parking management system of FIG. 1.

FIG. 2 is a detailed view of the system controller 14. The controller 14 consists of two basic portions, a control panel 21 and a display panel 23. The control panel 21 includes a plurality of devices for inputting the identity of the driver (or a passenger) of the vehicle which has stopped at the controller 14. These input devices may include one or more of a magnetic or optical card reader 25, a fingerprint or retinal scan detector 26, a keypad 27, a remote transmitter infra-red or rf) or voice detector 28 and a touch screen 29, or any combination thereof. There is also a standard push button 30, which may be actuated to obtain a printed ticket from a ticket dispenser 31 for those persons who have no need or desire to access activity (reservation) information to aid them in parking their vehicle. Finally, a printer 24 is provided to print out information useful to the driver, such as the identification of one or more preferred parking locations (including floor level, aisle, and parking space number), the date and time of entry in the parking facility, the gate number of a flight on which he/she has a reservation, the flight status and departure time, etc. This information could also be provided by an audio (speech) message, infra-red or radio transmission (such as to a portable computer, PDA device or GPS system) or other communication means, and not require a printed ticket.

The display panel 23 on the system controller 14 provides a layout diagram of the parking facility or a typical floor thereof, showing all of the parking spaces and pedestrian exits, with designations being provided for all aisles, parking spaces and exits. In addition, an LED is provided in each parking space depicted on the display to be used for identifying spaces that are vacant. By blinking selected LEDs, one or more preferred spaces can be indicated to the driver for parking his/her vehicle in a location most convenient to a particular pedestrian exit which is closest to the activity (airline terminal or gate) to which the driver is headed. An identification of these selected parking spaces will also be indicated on the printout provided by the printer 24. There are also a plurality of LEDs which can be selectively illuminated to indicate a level of the parking facility where multiple levels of parking exist.

Figure 3:
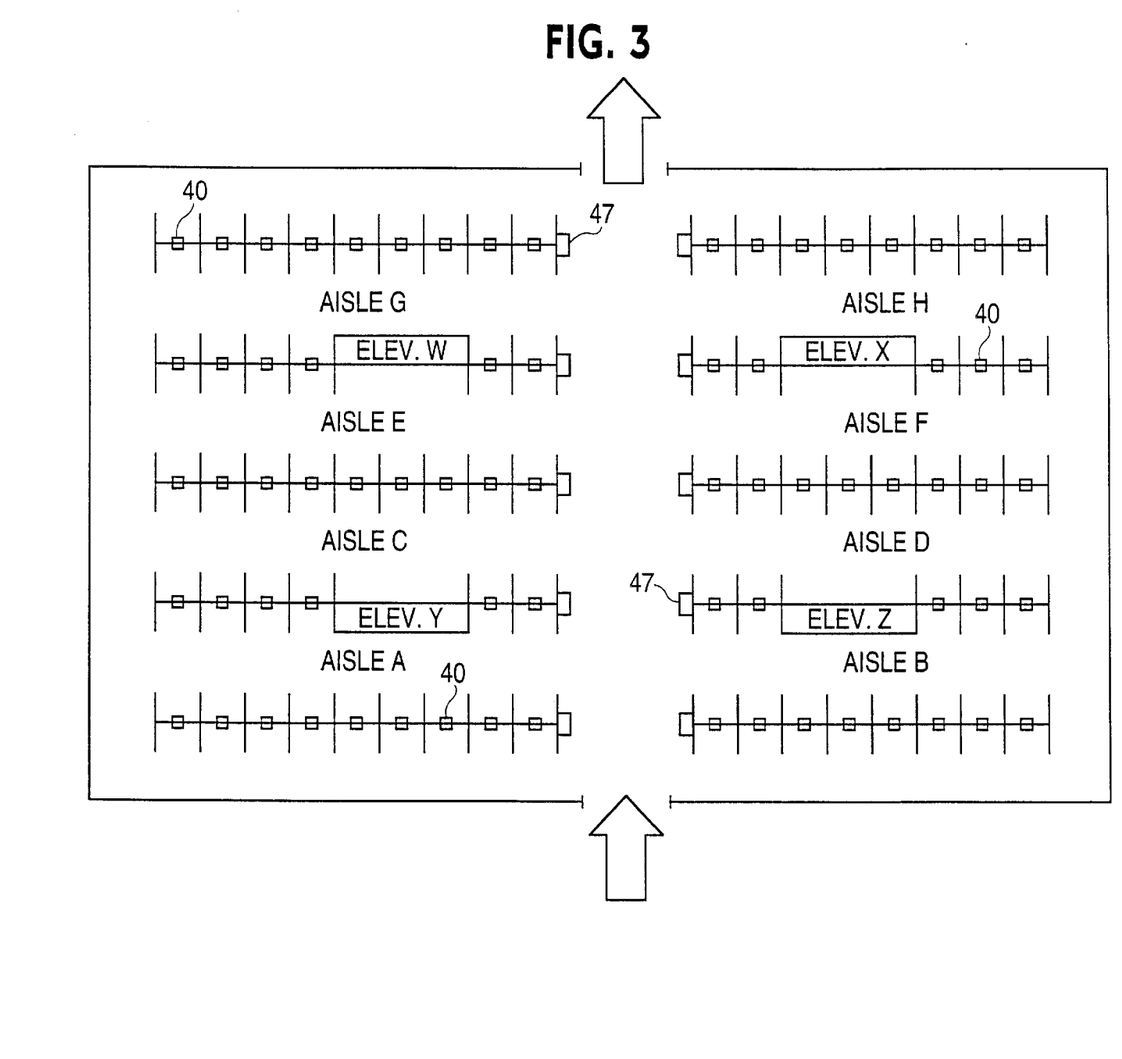
FIG. 3 is a diagram showing an example of a parking facility layout in which the parking management system of the present invention may be employed.

FIG. 3 shows an example of a parking facility layout of the type which may be associated with an airport. Although only one level is shown, it is to be understood that the parking facility may typically have a plurality of levels of the type shown. Such a parking facility may comprise the upper levels of the airport terminal building itself, or the parking facility may be located adjacent to the terminal building and be accessible by way of a monorail or other type of public transportation, such as provided at Tampa International Airport in Tampa, Fla., for example.

As seen in FIG. 3, each parking level is divided into four basic areas, each accessible to one of the four elevator blocks W, X, Y and Z. There is a main central aisle by which vehicles enter and exit the parking level, with an entrance and exit being located on opposite long sides of the parking area. Within the parking area, a plurality of side aisles A–H extend from the main central aisle to provide access to the individual parking spaces.

Each parking space is individually numbered, although not shown in the drawing, and the side aisles are provided with their respective designations to aide a driver in finding a particular parking space, either at the time a vehicle is being parked or when the driver is returning to his/her vehicle to leave the parking facility. Thus, in the layout shown for a multi-level parking facility, a particular parking space would be identified by the level, the aisle and the parking space number. As can be appreciated, if a driver does not write down the parking space identification or have some other means of later identifying the parking space location of his/her vehicle, it will likely be very difficult to find the vehicle upon his/her return.

Figure 4:
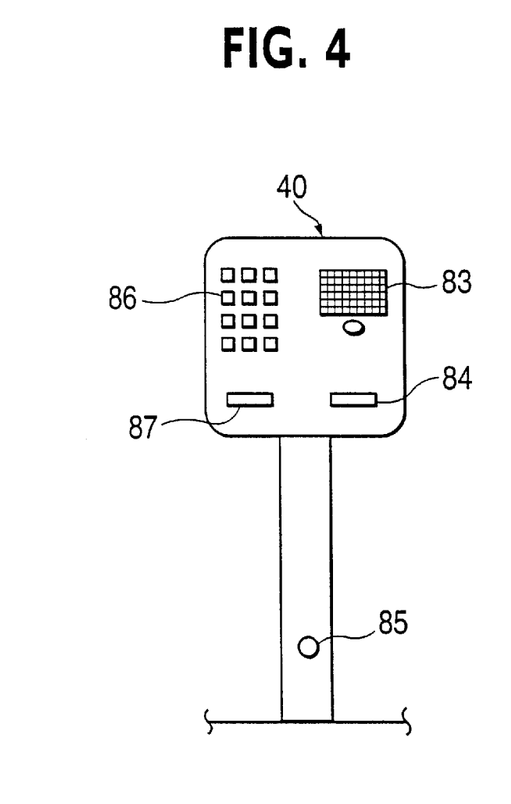
FIG. 4 is a diagram of a typical parking space terminal device as used in the parking management system of FIG. 1.

Each parking space in the parking area may be provided with a terminal device 40, so that all spaces become "smart spots" which are able to communicate with a central reservation system and input or access information relevant to use of the parking space, as well as passenger information. As seen in FIG. 4, a terminal device 40 is similar in size to a standard parking meter, but includes such features as a magnetic or optical card reader 87, a keypad 86, an intercom 83 and a printer 84. Further, a sensor 85 is provided either in the support post of the terminal device, as shown, in the main body thereof or other suitable location to detect the presence of a vehicle in the parking space. The terminal device preferably has a memory chip which stores the parking space identification (level, aisle and space #) which may be printed upon request (via the keyboard) by the printer 84 to provide the driver with a written record. Although not shown, the terminal device could also include a display screen to provide information from the reservation system, such as gate location, departure time and flight number information in response to the input of personal identification information, as will be described in more detail later.

In lieu of providing an individual terminal device 40 at each parking space, or in addition thereto, it is possible to provide a terminal device 47 of similar construction at spaced locations in the parking area on each level, such as at the end of each row. In such case, a person parking a vehicle in a particular row would input into the terminal device 47 his/her personal identification, such as by magnetic card, keyboard or other means, along with the number of the space occupied by his/her vehicle, and the parking information will be stored in data storage, as will be described in more detail later. The terminal 47 could also be used upon return to obtain the identification of the location where an individual has parked his/her car.

Figure 5:
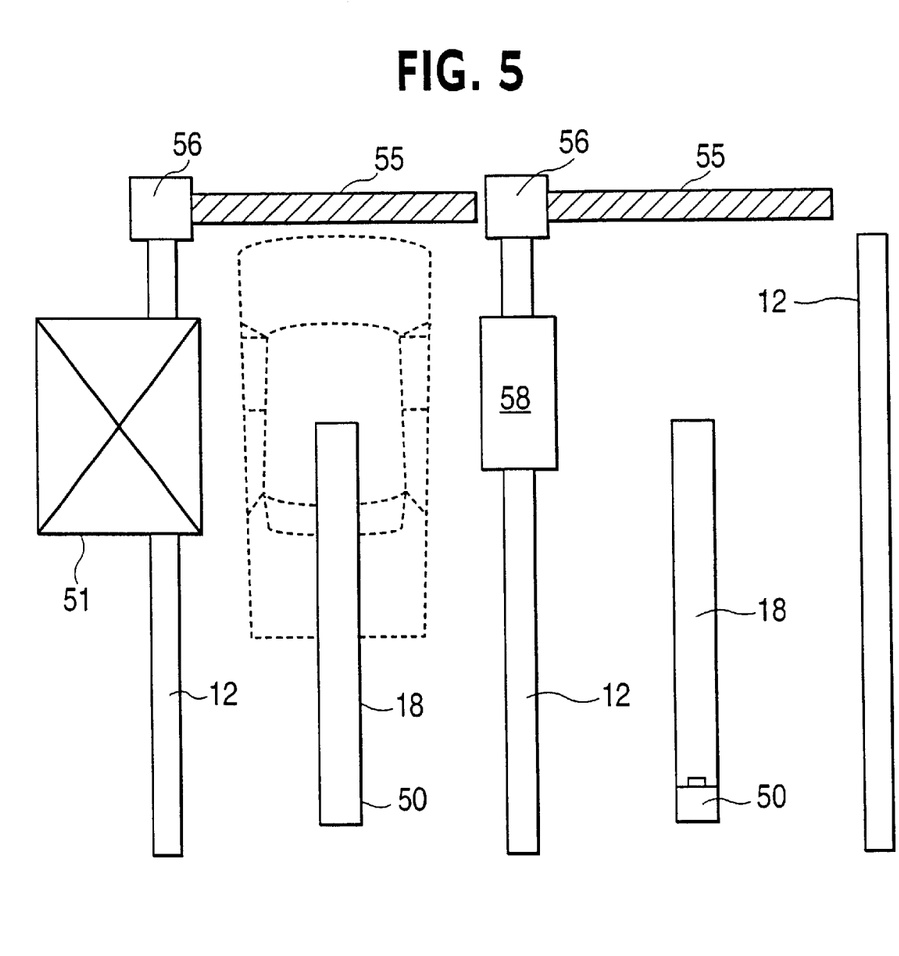
FIG. 5 is a diagram showing a top view of a vehicle exit of the parking facility.

FIG. 5 is a top view diagram of the vehicle exit from the parking facility. At the exit there is at least one lane that is controlled by an attendant to accommodate people who want to park in the conventional manner. In such case, payment for parking would typically be in cash based on the ticket issued to the driver at the entrance to the parking facility. For this purpose, as seen in FIG. 5, a building 51 is provided for the attendant adjacent to one of the exit lanes, which are defined by suitable curbing similar to that provided at the vehicle entrance, with an electrically controlled gate 55 being positioned at the end of the exit lane. A video camera 50 is also provided in a center curb 18 in each exit lane at a position which allows it to view the rear of a vehicle in the exit lane so as to scan the license tag to pick up the license number of the vehicle for identification purposes.

Those drivers who exit through the automatic gates will pull into an exit lane having a gate controller 58 rather than an attendant. The gate controller 58 is a simpler version of the system controller 14 located at the vehicle entry in that it does not include a display panel, and the control panel does not require a ticket dispenser, although a printer may be provided to dispense a receipt. Thus, the control panel of the gate controller 58 will include means for inputting the identification of the driver, such as one or more of a magnetic or optical card reader, a fingerprint or retinal scan detector, a keypad, a remote transmitter detector and the like. As in the exit lane which is under the control of an attendant, all automatic lanes are provided with a video camera 50 to detect and input license number information relevant to a vehicle which pulls into the exit lane.

Figure 6:
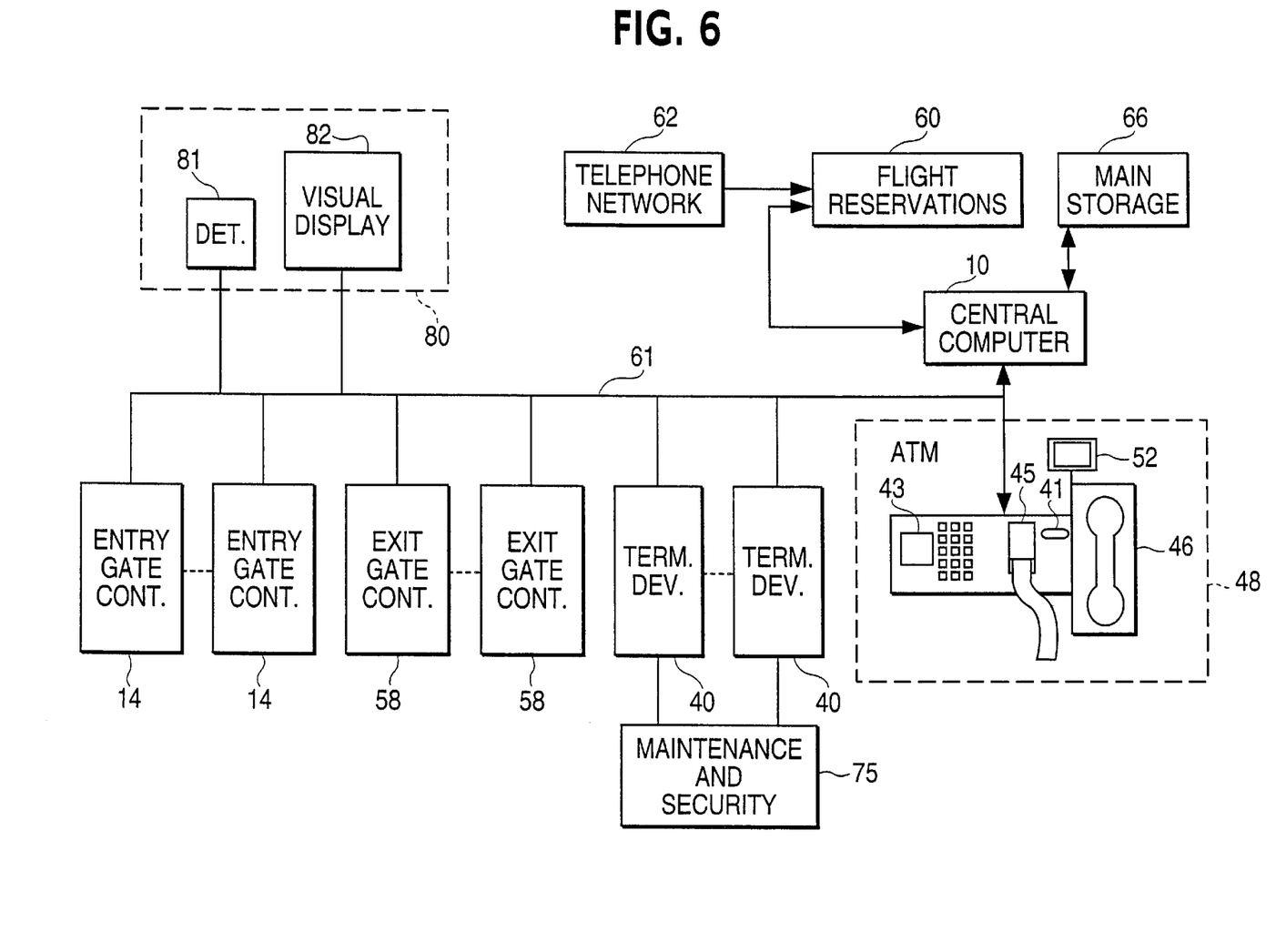
FIG. 6 is a block diagram of the overall control system in the parking management system of the present invention.
Figure 8:
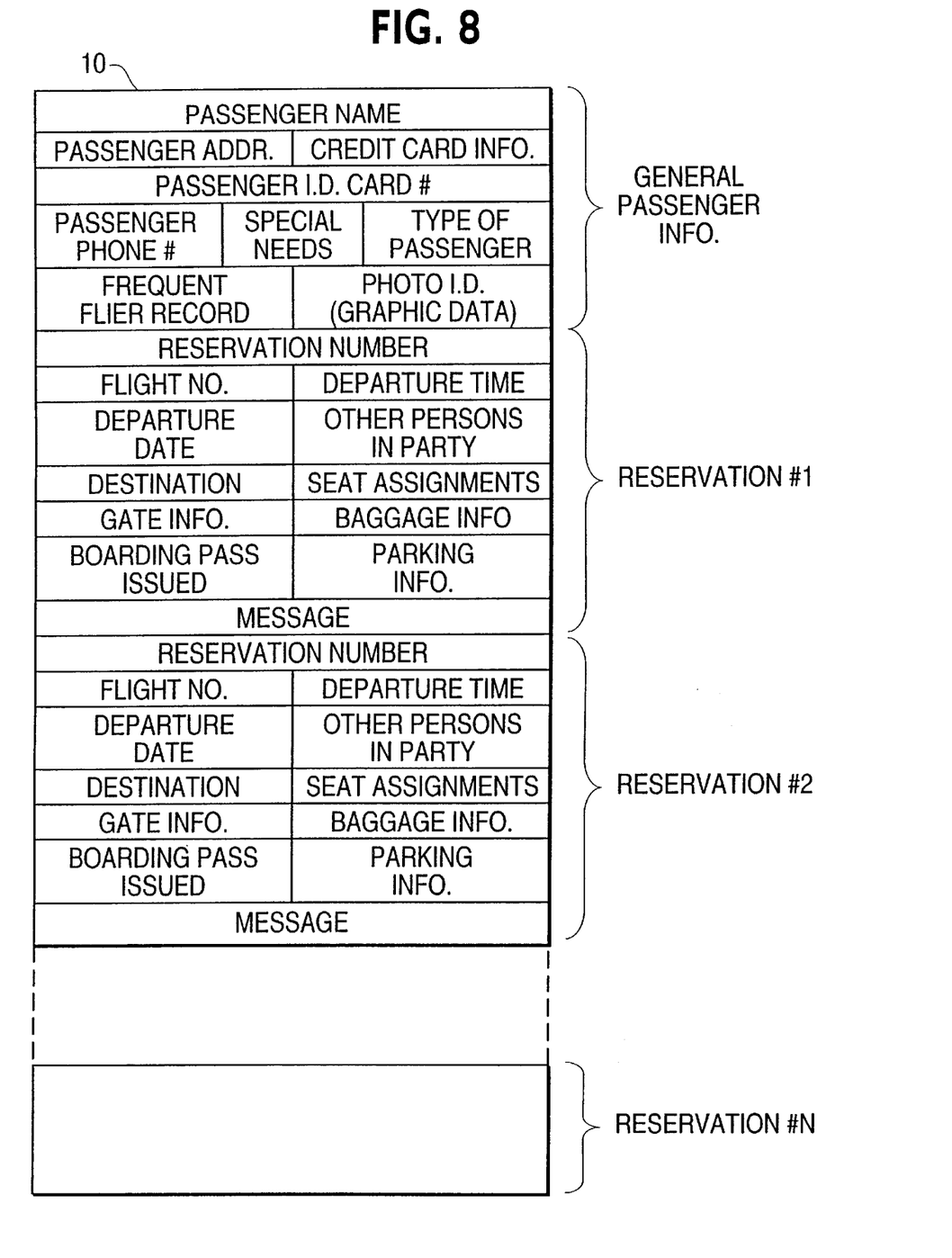
FIG. 8 is a diagram showing information stored in a central data base.

Referring now to FIG. 6, this embodiment of the present invention is associated with a flight reservation system of the type disclosed in the above-mentioned Goheen patent, which is implemented by a central computer 10, such as a main frame computer, connected to a main storage 66 that holds a passenger record for each passenger who has made an airline reservation and has been given a specific ID # to be used in accessing main storage. As seen in FIG. 8, each passenger record provides all flight and passenger profile information, including the name of the passenger, the telephone number of the passenger, the reservation number assigned to a specific reservation, and the identification card number of the passenger, along with credit card information. For purposes of the present invention, parking information is also provided in a passenger record along with gate information and seat assignment information, so that, on the basis of this information, the system can determine the most convenient pedestrian exit from the parking garage to the gate assigned to the flight a passenger is taking or a person is meeting to pick up an arriving passenger, as will be described in more detail later.

The central computer 10 is connected to a reservations center 60 that allows flight reservations personnel to input data to and access the central computer 10 at all times. A conventional telephone network 62 allows for call-in on an 800 number or direct phone line to personnel at the flight reservations center 60 for making a reservation for a particular flight.

A bus 61 (or other form of communication media, including wireless communication) provides for communication between the central computer 10 and the various components of the parking management system of the present invention, including the entry gate controllers 14, the exit gate controllers 58, the terminal devices 40 provided at each parking space, and the ATMs 48 provided at various locations in the parking garage and the airport terminal building. The terminal devices 40 are also connected to a maintenance and security terminal 75 by telephone and/or signal lines to allow individuals in the garage to communicate with personnel when they need information or assistance.

Each ATM includes a card reader 41, a CRT or other visual display 43 (possibly with a touch screen), and a printer 45 to provide a record of the same information as that provided on the screen 43. There is also a scanner 52 to detect a fingerprint or to scan the retina of the person using the ATM, thereby verifying the identity of the card holder with reference to identifying information stored in the main storage 66. If the passenger identity is not verified, the system will not provide information from main storage 66 to the card holder. This ATM can provide parking information to an arriving passenger who has forgotten the location of his/her vehicle in the parking garage.

As already indicated, access between the parking facility and the main terminal building may be by way of a monorail or tram, which stops at each of the pedestrian exits in the parking facility and each of a plurality of terminals which service different airlines in the main terminal building. As a means of guiding people traveling between the parking facility and the main terminal building, each car of the monorail or tram is provided with a destination indication system 80 (although only one is shown in FIG. 6) to provide a visual display 82 on which destination information is displayed on the basis of personal identification detected by a detector 81 (preferably contact-less) as a person boards the car, as will be described in more detail later. In the alternative, or in addition, an audio system may be provided in the car to announce destination information personal to each passenger.

Figure 7:
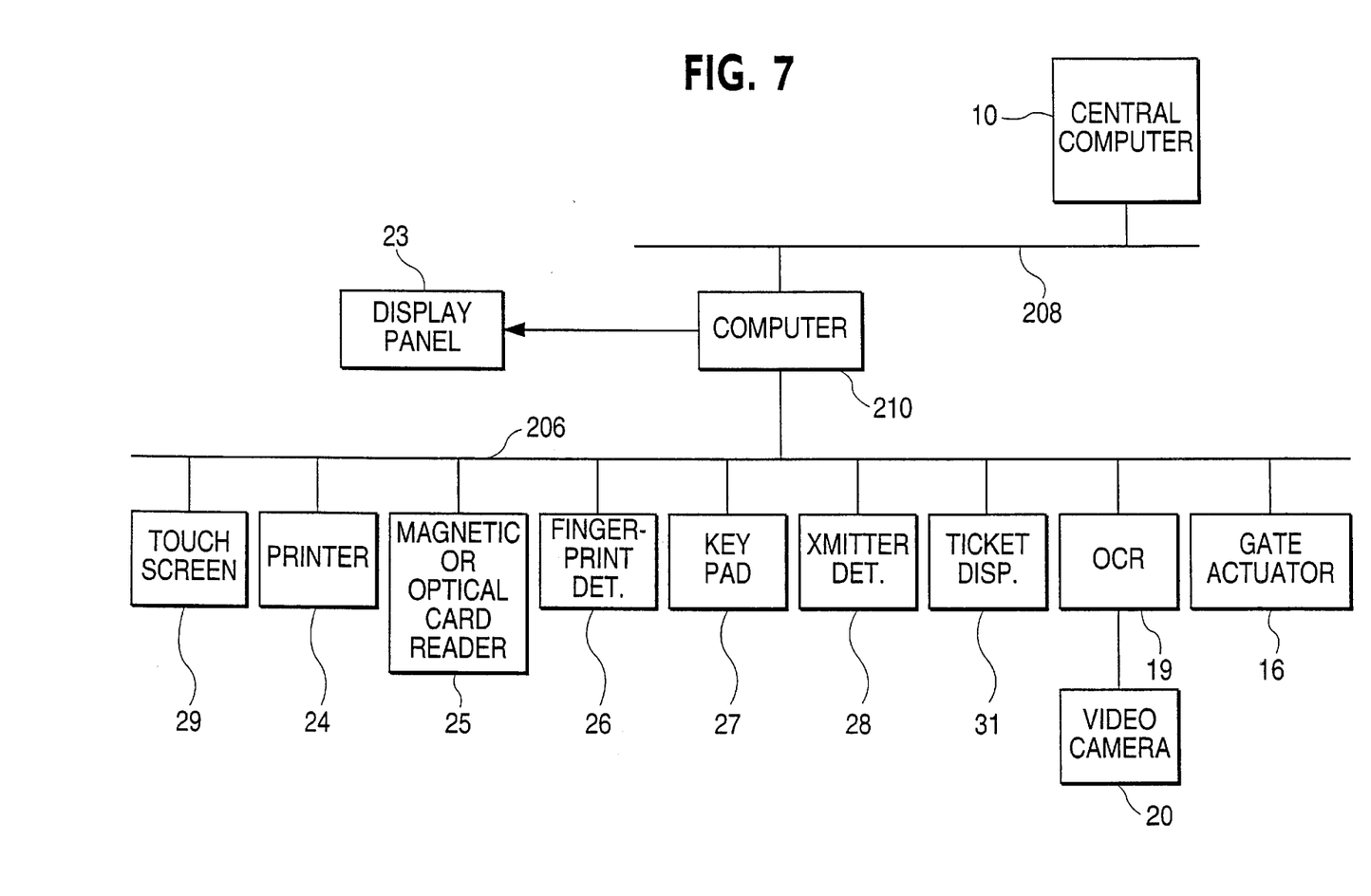
FIG. 7 is a block diagram of a gate controller in the control system of FIG. 6.

FIG. 7 shows the elements which make up a typical gate controller in the system of FIG. 6. As indicated previously, the entry gate controllers 14 are similar to the exit gate controllers 58, the main difference being that the exit gate controllers do not include a display panel 23 and a ticket dispenser 31, and the printer 24 is used simply for providing a receipt. The main functions of the gate controller are performed by a computer 210 which is connected via any suitable communication media or direct bus connection 61 to the central computer 10. The computer 210 is also connected via bus 206 to various input/output devices, including touch screen 29, printer 24, magnetic or optical card reader 25, fingerprint or retina scan detector 26, keypad 27, transmitter or voice detector 28, ticket dispenser 31 and optical character reader 19, which receives an input from video camera 20.

The computer 210 is also connected to the display panel 23 to effect control thereof. In this regard, the display panel 23 may provide a permanent image of the layout of the parking area with LEDs provided in each parking space in the display to indicate a status of the parking space, or the display screen 23 may be provided in the form of a CRT or LCD panel.

Typical aspects of the present invention will be described in conjunction with the operation of the embodiment illustrated in FIGS. 1–8.

A person arriving at the airport in a vehicle proceeds to the parking facility and drives into an entry lane up to an entrance gate 11 to a point adjacent the control panel 21 and display panel 23 of the gate controller 14. The driver has a plurality of options for obtaining entry to the parking facility depending on whether or not he/she has personal identification information on file, what type of information has been stored and whether he/she has a card or other device to provide personal identification.

In the Goheen system described above, a personal identification card is issued to anyone who makes an airline reservation, and this card, which stores a unique ID # on a magnetic strip, can be used in lieu of a ticket and for other purposes as a means of identification. This same magnetic card can be used to enter the parking facility by simply inserting the card into the card reader 25, which reads the ID # from the card, either by reading a magnetic strip or by scanning a bar code, under control of the computer 210, which then forwards the ID # to the central computer 10 for use in accessing a personal file in main storage 66 based on that ID #.

Similar access to a file in main storage 66 can be obtained by inputting an ID # using an infra-red transmitter or rf contact-less device in conjunction with the transmitter detector 28, or the driver may identify himself/herself by retinal scan or fingerprint detection using the detector 26, if such information has previously been recorded in the system. Similarly, a voice recognition system could be provided. In the case of retinal scan or fingerprint detection, the central computer correlates the received data with previously stored data to obtain the ID # of the individual. The ID # could also be input directly using the keypad 27 or the touch screen 29. However, a preferable way of inputting an ID # is by use of an rf contact-less device, of the type now commonly used at gas pumps and toll booths, for example. In such case, as the driver pulls into the entry lane, the driver's (or a passenger's) ID # will be immediately picked up and the appropriate file in main storage accessed automatically.

When the central computer 10 has accessed the personal file of the driver (or a passenger in the vehicle) in main storage 66, the file is checked to determine if there is a flight reservation for that day, and, if so, the flight information is forwarded, along with credit card information to be used for billing purposes, to the computer 210 in the gate controller 14. Based on the received flight information, which includes the flight number, departure time and gate information, the computer 210 determines the elevator bank most convenient to the assigned gate, selects one or more available parking spaces close to that elevator bank, and controls the display panel 23 to visually indicate the selected parking spaces by blinking the LEDs in those spaces, while illuminating the LED which identifies the level. At the same time, the printer 24 issues a paper which identifies the selected level and suggested parking spaces on that level, the elevator bank to take, and the gate assigned to the flight, so that the driver will have printed instructions to follow as he/she proceeds into the parking facility to park the vehicle. If the vehicle has an on-board GPS (global positioning system) with a data inputting capability via wire-less link or keyboard, parking information could be inputted to the GPS from the computer 210 to allow the GPS to guide the driver to a selected parking space.

If the file accessed by the central computer 10 indicates no reservation for that day, this information is sent back to the computer 210 in the gate controller 14. The computer 210 then displays a message on the touch screen 29 (or issues an audio message) requesting information as to the destination of the driver, such as a specific airline ticket counter, a commercial facility in the terminal building, or a particular flight which the driver is meeting to pick up an arriving passenger, for example. The driver then inputs the requested information using the touch panel 29 or the keypad 27, and the computer 210 controls the display panel 23 to indicate suggested parking spaces and provides a printout via the printer 24 in the same manner as indicated above.

If the central computer 10 fails to find a file in the main storage 66 based on a received ID #, this information is forwarded to the computer 210, which provides a message on the touch screen 29 indicating that no file has been found, and requests information as to the destination of the driver, and the operation then proceeds as described above. Finally, if the driver does not wish to use the parking management features of the system for some reason, he/she can simply press the button 30 and obtain a conventional ticket from the ticket dispenser 31.

With actuation of the printer 24 or the ticket dispenser 31, the computer 210 in the gate controller 14 accesses data from the optical character reader, which digitizes the view of the license plate of the vehicle, and stores in memory the vehicle tag number, along with the driver ID # or ticket number, as well as the time and date to be used for billing purposes. The computer 210 then operates the gate actuator 16 to open the gate 11 to allow the driver to enter the parking facility.

The driver will then proceed to the level designated by the system and select one of the available parking spaces suggested by the system. As soon as the vehicle enters a parking space, the detector 85 will sense the presence of the vehicle, and the terminal device 40 will notify the computer 210 to update the records of available parking spaces.

At the parking space, the driver inserts his/her identification card into the card reader of the terminal device 40 or inputs his/her ID # using the keypad, and the terminal device will send the parking space identifying information to the central computer 10, which stores this information in the file of the individual in main storage 66. Where the driver or a passenger has an rf contact-less device, the ID # will be picked up automatically as the vehicle pulls into the parking space, which greatly simplifies the process and avoids the possibility that the driver will forget to notify the system as to the parking space he/she has taken. If terminal devices 40 are not provided at each parking space, and there is no rf contact-less device in the vehicle, then the driver must locate a nearby terminal device 47 and input the number of the parking space which he/she has taken in addition to the ID #.

Using the information provided on the printout received at the entrance to the parking facility, the individual proceeds to the designated elevator, which should be nearby, and take an elevator to the gate area, ticket counter or other destination, as the case may be, and this is accomplished in a most efficient way, since the system has already directed the individual to a parking space which is most accessible to his/her destination in the terminal building.

In the case where the parking facility is in a building which is connected to the terminal building by a monorail or tram, the present invention provides additional assistance. More particularly, in the doorway of each car of the monorail or tram there is a detector 81, which is preferably a contact-less detector, but may also be a card reader. As an individual enters the car, the ID # of the individual is obtained and forwarded to the computer 210, which already has the destination information for that individual. On the basis of this destination information, the computer 210 operates the visual display 82 to display the name of the individual, the gate number and the identification of the stop where the individual should disembark to reach that destination.

The above-mentioned feature is also extremely useful in the case of connections between flights at airports, such as in Dallas/Ft. Worth, where a monorail or tram is used to carry passengers between gates for airlines which occupy a plurality of terminal buildings. In such case, when the computer 210 has no record concerning a passenger (because the passenger arrived at that airport on a flight), access will be made to the central computer 10 to obtain flight information from the passenger's file, such as arriving and departing flight numbers and their related gate numbers. Thus, the arriving passenger need only get on the monorail or tram and input his/her ID #, and the visual display 82 will display his/her name, the gate number of the connecting flight and the flight number thereof and the stop at which the passenger should disembark. Again, this process is greatly facilitated if the passenger is carrying an RF contact-less device for identification.

In the Goheen system, for example, as a passenger boards an aircraft at the gate, the passenger ID # is forwarded to the central computer 10 to access the passenger's file in main storage 66. The passenger file is then updated to show that the passenger boarded and this information is correlated with baggage check information to make sure that all passengers who checked bags also boarded the aircraft. In accordance with the present invention, at this time, the central computer 10 retrieves seat assignment information from the passenger record and forwards this information to a computer at the gate, which then sends this information to seat display devices within the aircraft to display the name of the passenger at his/her seat, thereby allowing the boarding passenger to easily identify his/her seat, as will be described more particularly with reference to FIGS. 9 and 10.

Figure 9:
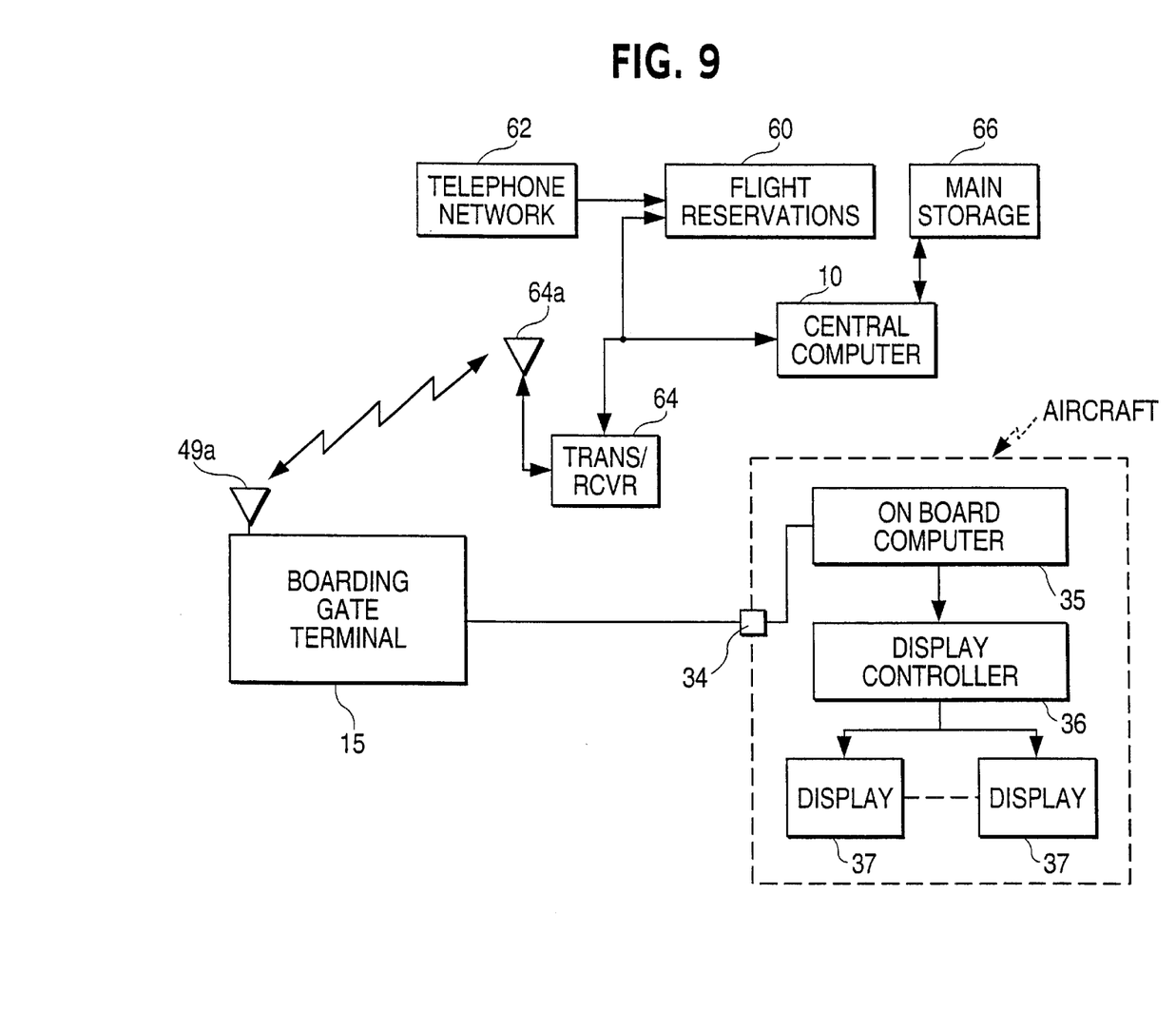
FIG. 9 is a block diagram of the control arrangement for effecting the display of passenger names at seats in the cabin of an airplane according to the present invention.

In the above-mentioned Goheen system, a communication device 15 serving as a boarding gate terminal is provided in the form of a mobile device that communicates with the central computer 10 via a wireless connection including an antenna 49a at the terminal 15 and antenna 64a connected to a transceiver 64. The transceiver 64 is connected to the central computer 10 and the flight reservations center 60, as seen in FIG. 9, so that a gate attendant may communicate with either location. While the boarding gate terminal is shown as a mobile unit, it may also take the form of a relatively fixed location remote terminal.

As seen in FIG. 9, the boarding gate terminal 15 can be temporarily connected to the on-board computer 35 in an airplane via a connector 34 of the type typically provided at the outer body of the aircraft for such purposes. The on-board computer 35 is connected via a display controller 36 to a plurality of display devices, such as small liquid crystal panels, which are mounted through the passenger cabin at positions corresponding to the respective passenger seats.

Figure 10:
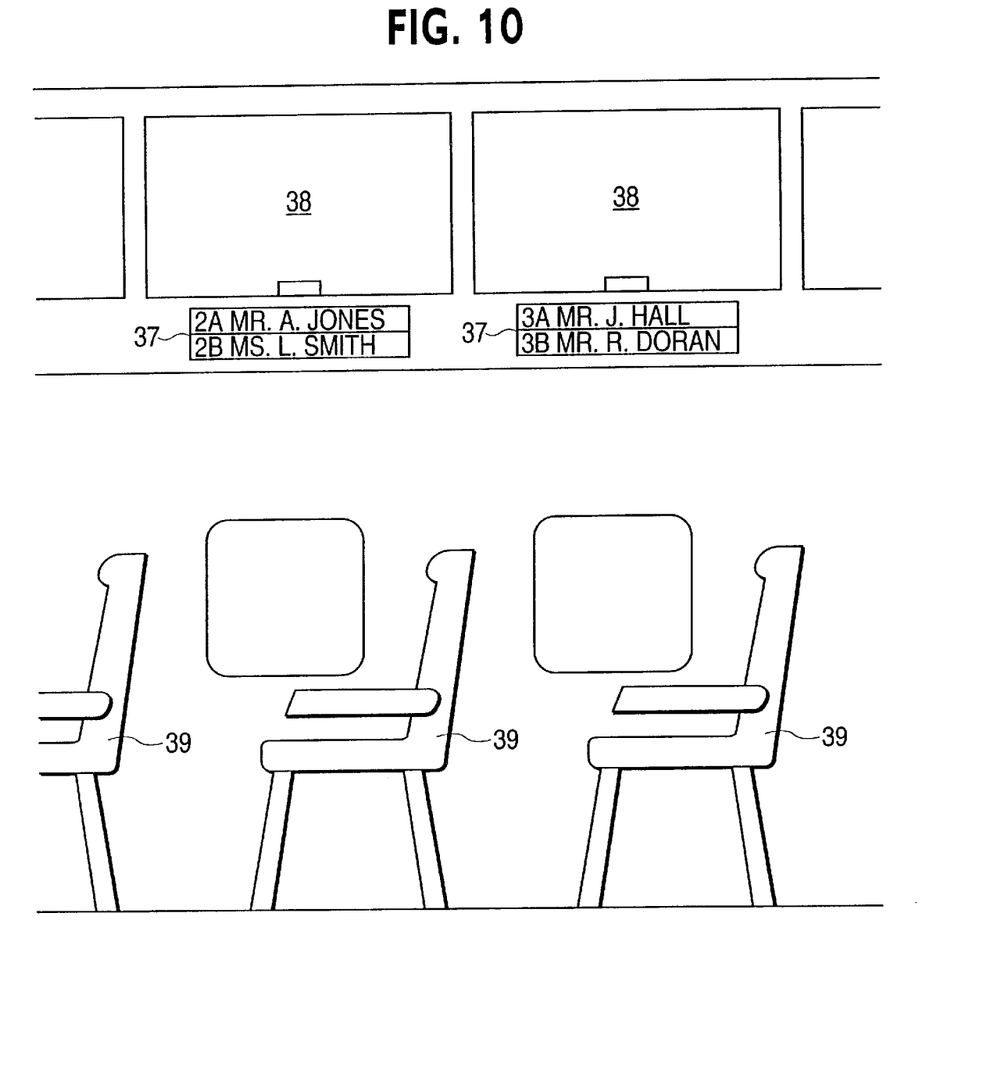
FIG. 10 is a diagram of a portion of the cabin of an airplane showing the display of passenger names in conjunction with the seats to aid passengers in finding their seats.

As seen in FIG. 10, a display panel 37 is located above each seat row on both sides of the center aisle, above the aisle seat 39 and just below the overhead compartment 38. Of course, the display panels 37 could be located elsewhere, such as at the back of each seat, but location of the display panels just below the overhead compartments, as seen in FIG. 10, is preferable for providing the most help to passengers boarding the plane. In addition, the display of passenger names in conjunction with the seat locations makes it possible for the attendants to address the passengers by name, which is very desirable from a public relations point of view.

Upon returning from a flight, if the passenger does not remember the location at which he/she has parked in the parking garage and no longer has the printout received at the parking garage entrance at the time the car was parked, he/she need only proceed to the nearest ATM 48 and insert their identification or input their ID # via the keyboard to receive printed information which locates their parking space and provides directions to get there most quickly. If the passenger takes a monorail or tram, inputting of the individuals ID # upon entering the car will cause a display to appear on the visual display 82 in the car to identify the stop at which the individual should disembark, as described above.

Upon reaching his/her vehicle, if the vehicle is missing, there has been vandalism or assistance is needed in starting the vehicle, for example, the individual can communicate with the maintenance and security terminal 75 using the intercom 83 or the keypad 86 on the terminal device 40 or 47 to obtain assistance.

When the vehicle is backed out of the parking space, the detector 85 sends a signal to the computer 210 to indicate the availability of the parking space, and the computer 210 updates its records accordingly. The driver then proceeds to the exit from the parking facility. If the driver has merely obtained a ticket upon entering the parking facility and wishes to pay for parking in cash, he/she will proceed to an exit lane where an attendant is present and pay in the normal way.

On the other hand, drivers who wish to pay on the basis of previously stored credit information will proceed to an exit lane having a controller 58 instead of an attendant. In this exit lane, it is necessary only to input an ID #, which the computer 210 uses to access the arrival time and date information from memory for that individual, along with the license tag number which was stored at the time the vehicle entered the parking facility. Entry of the ID # can be effected in any of the same ways employed at the entry gate controller, but is most efficient if effected in a contact-less manner. The computer 210 then obtains the license tag number viewed by the video camera 50 in the exit lane and compares the two tag numbers to determine that the driver who parked the vehicle is the same person who is leaving with that same vehicle. If the numbers match, the computer debits the credit account of the driver for the appropriate parking fee and controls the gate actuator 56 to raise the gate 55, allowing the vehicle to depart. If the numbers do not match, appropriate steps are taken to summon an attendant, such as with an alarm and/or with a flashing light, and the gate 55 remains closed until the problem is solved.

While the foregoing embodiment has been directed to an application of the invention to a parking facility at an airport terminal, it will be appreciated that other applications are possible. For example, the invention may be applied equally well to a sports or other type of entertainment arena or stadium. In this regard, parking space selection by the system would be directed to the location of the seats reserved for the event according to the section number and seat number stored in the main storage 66.

The present invention is also applicable to systems in which reservations are not involved. For example, in the case of a shopping mall, parking space selection by the system at the entrance to the parking facility of the mall could be based on a department store or other shop identification entered by the driver at the control panel 21 of the entry gate controller 14. In this way, the driver is directed to an available parking space which is closest to the area of the mall that the people in the vehicle are most interested in. This also allows the owners of the mall to determine from information received at the entrances to the parking facility how many people come to the mall to visit particular stores. Such information is useful from a business point of view and in determining how much parking space is needed for each store in the mall.

While the present invention has been described in connection with various embodiments thereof, obvious modifications and changes may be made by those skilled in the art without departing from the spirit and scope of the invention. Accordingly, the scope of the invention is to be limited only by the appended claims.

What is claimed is:

1. A personal guidance system, responsive to reservation information for a prescheduled activity which is to take place at a predetermined location, for guiding an individual having a reservation for said prescheduled activity to said predetermined location, comprising:
   a memory in which there is stored at least one personal file which is accessible by personal identification information and which includes reservation information concerning a prescheduled activity; and
   a terminal device, including inputting means by which a person inputs personal identification information, means for retrieving reservation information from a personal file of said person in said memory using inputted personal identification information, and means for providing guidance information to guide said person from the location of said terminal device to a location of a prescheduled activity, for which said person has a reservation, based on said retrieved reservation information.

2. A personal guidance system according to claim 1, wherein said terminal device further includes a display device for displaying graphic data, and said guidance information comprises graphic data which is displayed on said display device.

3. A personal guidance system according to claim 1, wherein said graphic data is map data.

4. A personal guidance system according to claim 1, wherein said terminal device further includes a display device on which said guidance information is displayed.

5. A personal guidance system according to claim 1, wherein said inputting means comprises a magnetic card reader.

6. A personal guidance system according to claim 1, wherein said inputting means comprises a detector which reads information from an RF contact-less device.

7. A personal guidance system according to claim 1, wherein said terminal device is located at an entrance to a parking facility, and said guidance information identifies at least one available parking space in said parking facility which is close to the prescheduled activity for which the person has a reservation.

8. A personal guidance system according to claim 1, wherein said terminal device is located in a car of a public transportation vehicle, and said guidance information includes the name of said person and an identification of the stop of the public transportation vehicle which is closest to the prescheduled activity for which the person has a reservation, said terminal device having a display device on which said guidance information is displayed.

9. A personal guidance system according to claim 8, wherein said inputting means comprises a detector which reads information from an RF contact-less device.

10. A parking management system for identifying one or more available parking spaces, in a parking facility at a predetermined location at which a prescheduled activity is to take place, on the basis of previously stored reservation information concerning said prescheduled activity, comprising:

a memory in which there is stored at least one personal file which is accessible by personal identification information and which includes reservation information concerning a prescheduled activity;

a terminal device, including inputting means by which a person inputs personal identification information and information providing means for providing guidance information to said person; and control means for retrieving reservation information from a personal file of said person in said memory using personal identification information inputted through said terminal device, for determining which parking spaces in said parking facility are available, for selecting at least one available parking space in said parking facility which is close to the prescheduled activity for which the person has a reservation, and for supplying an identification of a selected available parking space to said information providing means.

11. A parking management system according to claim 10, wherein said information providing means is a display device.

12. A parking management system according to claim 10, wherein said information providing means is a printer.

13. A parking management system according to claim 10, wherein said prescheduled activity is an airline flight, and said parking facility is associated with an airline terminal having separate facilities for respective airlines at spaced locations and said parking facility has a plurality of pedestrian exits at respective locations convenient to respective airline facilities, said control means including means responsive to retrieved flight reservation information for selecting the closest available parking space to a pedestrian exit which is closest to the airline facility for the airline flight for which the person has a reservation.

14. A parking management system according to claim 13, further comprising detection means at each parking space of said parking facility for detecting the presence of a vehicle in that parking space, said control means including means responsive to said detection means for storing information identifying the status of each parking space based on information received from said detection means, and at least one further terminal within said parking facility having further inputting means from which personal identification information and parking space information can be forwarded to said control means.

15. A parking management system according to claim 14, wherein a further inputting means is provided at each parking space and includes means for automatically forwarding parking space identification information with inputted personal identification information to said control means.

16. A parking management system according to claim 15, wherein said further inputting means includes a detector which reads information from an RF contact-less device.

17. A parking management system according to claim 15, wherein said control means includes means for storing parking space identification information in a file in said memory based on inputted personal identification information, and wherein said airline terminal has additional terminals at spaced locations convenient to said airline facilities, which additional terminals include additional inputting means for inputting personal identification information, means for accessing a file in said memory on the basis of inputted personal identification information to read out parking space identification information, and means for indicating said read out parking space identification information to guide a person to a parking space.

18. A parking management system according to claim 13, wherein said parking facility has at least one vehicle entrance and at least one vehicle exit, and further including a first video camera positioned at said vehicle entrance so as to scan the license plate of a vehicle which enters said parking facility, means responsive to said first video camera and personal identification information inputted at said terminal device for storing first license plate identification information in a personal file in said memory, a second video camera positioned at said vehicle exit so as to scan the license plate of a vehicle which is attempting to leave through said vehicle exit for generating second license plate identifying information, means responsive to personal identification information inputted at said vehicle exit for accessing said file in said memory and for comparing said first and second license plate identifying information, and means for indicating when said first and second license plate identifying information do not match.

19. A parking management system according to claim 10, wherein said information providing means comprises a display device depicting the parking space layout of the parking facility with means for visually identifying one or more available parking spaces selected by said control means.

20. A parking management system for identifying one or more available parking spaces, in a parking facility having at least one vehicle entrance and at least one vehicle exit and plural areas of parking spaces each accessible to a respectively different part of a location at which a prescheduled activity is to take place, on the basis of previously stored reservation information concerning said prescheduled activity, comprising:

a memory in which there is stored personal files each of which is accessible by personal identification information and includes reservation information concerning a prescheduled activity;

detection means at each parking space of said parking facility for detecting the presence of a vehicle in that parking space;

a first terminal device at said vehicle entrance and a second terminal device located at each parking space, each of said first and second terminal devices having inputting means for inputting personal identification information;

a display device located at said vehicle entrance for depicting the parking space layout of the parking facility with means for visually identifying one or more available parking spaces;

means responsive to personal identification information inputted at said first terminal device for accessing a file in said memory to retrieve reservation information therefrom;

means responsive to said detection means at each parking space for determining which parking spaces are available for use; and means for selecting at least one available parking space in an area of said parking facility which is closest to the prescheduled activity indicated by the retrieved reservation information and for activating said display device to visually identify said selected parking space or spaces.

21. A parking management system according to claim 20, further including a printer for providing a printout identifying said selected parking space or spaces.

22. A parking management system according to claim 21, wherein said printer provides a printout of the layout of the parking facility with the selected parking space or spaces highlighted thereon.

23. A parking management system according to claim 21, wherein said printer also provides a printout of reservation information retrieved from a file in said memory.

24. A parking management system according to claim 20, wherein each second terminal device includes means responsive to the inputting of personal identification information for inserting parking information, which identifies the parking space at which said second terminal device is located, in a file in said memory which is accessed by said personal identification information.

25. A parking management system according to claim 24, further including at least one third terminal device, located outside of said parking facility and responsive to the inputting of personal identification information, for accessing a file in said memory to retrieve parking information therefrom.

26. A parking management system according to claim 20, wherein each second terminal device also includes communication means for effecting communication with a service to provide aid.

27. A parking management system according to claim 26, wherein said communication means comprises an intercom system.

28. A parking management system according to claim 20, wherein said inputting devices of said first terminal devices comprise one or more of a magnetic card reader, a bar code reader, a fingerprint detector, a retinal scan detector, a key pad, a RF contact-less detector, an infra-red detector, a voice recognition system, and a touch screen display panel.

29. A parking management system according to claim 20, further including means for reading the license plate number at said vehicle entrance, and means responsive to inputting of personal identification information via said first terminal for storing the license number of a vehicle in a file in said memory which is accessed with the inputted personal identification information.

30. A personal guidance system, responsive to reservation information for a prescheduled flight on an airplane which is to leave from a predetermined gate of an airport, for guiding an individual having a seat reservation for said prescheduled flight to his/her assigned seat on said airplane, comprising:

a memory in which there is stored at least one personal file which is accessible by personal identification information and which includes reservation information including seat assignment information;

a terminal device located at the gate of the airport from which a flight is to depart, including inputting means by which personal identification information is input;

means for retrieving reservation information, including seat assignment information, from a personal file in said memory using inputted personal identification information inputted through said terminal device;

display devices located in association with seats on said airplane; and means responsive to receipt of seat assignment information from said memory in response to the inputting of personal identification information for displaying said personal identification information on a display device associated with the seat indicated by the seat assignment information.

31. A personal guidance system according to claim 30, wherein the personal identification information displayed on said display device is a personal name.

32. A personal guidance system according to claim 30, wherein said airplane includes a plurality of groups of seats disposed on both sides of at least one aisle, and a respective display device is provided for each group of seats.

33. A personal guidance system according to claim 30, wherein said airplane includes a plurality of seats, and a separate display device is provided for each seat.

34. A personal guidance system according to claim 30, wherein a parking facility having a vehicle entrance and a vehicle exit and a plurality of parking spaces is provided at said airport, and further comprising:

detection means at each parking space of said parking facility for detecting the presence of a vehicle in that parking space;

a second terminal device at said vehicle entrance and a third terminal device located at each parking space, each of said second and third terminal devices having inputting means for inputting personal identification information;

a further display device located at said vehicle entrance for depicting the parking space layout of the parking facility with means for visually identifying one or more available parking spaces;

means responsive to personal identification information inputted at said second terminal device for accessing a file in said memory to retrieve reservation information therefrom;

means responsive to said detection means at each parking space for determining which parking spaces are available for use; and means for selecting at least one available parking space in said parking facility which is closest to the gate of a prescheduled flight indicated by the retrieved reservation information and for activating said further display device to visually identify said selected parking space or spaces.

35. A personal guidance system according to claim 34, wherein at least one of said second and third terminal devices has a printer for printing reservation information, including the identification of the gate from which a flight indicated in said reservation information is to depart, in response to the inputting of personal identification information to guide a passenger to said gate.

36. A personal guidance system according to claim 35, further including a first video camera positioned at said vehicle entrance so as to scan the license plate of a vehicle which enters said parking facility, means responsive to said first video camera and personal identification information inputted at said second terminal device for storing first license plate identification information in a personal file in said memory, a second video camera positioned at said vehicle exit so as to scan the license plate of a vehicle which is attempting to leave through said vehicle exit for generating second license plate identifying information, means responsive to personal identification information inputted at said vehicle exit for accessing said file in said memory and for comparing said first and second license plate identifying information, and means for indicating when said first and second license plate identifying information do not match.

* * * * *